(12) United States Patent
DeMartini

(10) Patent No.: US 12,035,685 B1
(45) Date of Patent: Jul. 16, 2024

(54) ANIMAL VEHICLE SEAT SUPPORT SYSTEM

(71) Applicant: Heather DeMartini, Austin, TX (US)

(72) Inventor: Heather DeMartini, Austin, TX (US)

( * ) Notice: Subject to any disclaimer, the term of this patent is extended or adjusted under 35 U.S.C. 154(b) by 46 days.

(21) Appl. No.: 18/090,817

(22) Filed: Dec. 29, 2022

(51) Int. Cl.
*A01K 1/02* (2006.01)

(52) U.S. Cl.
CPC .......... *A01K 1/0272* (2013.01); *A01K 1/0263* (2013.01)

(58) Field of Classification Search
CPC .. A01K 1/0272; A01K 1/0245; A01K 1/0254; B60R 22/10
USPC .......................................................... 119/771
See application file for complete search history.

(56) References Cited

U.S. PATENT DOCUMENTS

| 4,512,286 | A | * | 4/1985 | Rux | ...................... | A01K 1/0272 |
| | | | | | | 119/771 |
| 5,123,377 | A | * | 6/1992 | Edwards | .............. | A01K 1/0272 |
| | | | | | | 119/28.5 |
| 7,174,852 | B2 | * | 2/2007 | Jefferson | ................... | B62J 1/167 |
| | | | | | | 280/304.5 |
| D609,406 | S | | 2/2010 | Johnson | | |
| 10,086,734 | B2 | | 10/2018 | Ferreira Orta | | |
| 2012/0312251 | A1 | | 12/2012 | Udebiuwa | | |
| 2017/0320461 | A1 | | 11/2017 | Talevich | | |
| 2019/0380299 | A1 | | 12/2019 | Shewfelt | | |
| 2020/0086823 | A1 | * | 3/2020 | Koop | ................... | A01K 27/002 |
| 2020/0296919 | A1 | | 9/2020 | Jakubowski | | |
| 2020/0329666 | A1 | | 10/2020 | Blood | | |
| 2021/0061133 | A1 | | 3/2021 | Taylor | | |

FOREIGN PATENT DOCUMENTS

CA 2068455 11/1994

* cited by examiner

*Primary Examiner* — Yvonne R Abbott-Lewis

(57) ABSTRACT

An animal vehicle seat support system for retaining in a stable position by gyroscopic functionality includes a cradle having a top portion and a bottom portion. The cradle encloses an interior for receiving a small animal. A base ring extends around the cradle such that the base ring is rotationally attached to the cradle about a first axis. A frame is removably mounted to the vehicle seat and is attached to the base ring such that the base ring is rotational relative to the frame about a second axis. The frame includes a front support and a back support. A retainer is coupled to the cradle and is removably coupled to a harness of the small animal positioned within the interior of the cradle.

17 Claims, 9 Drawing Sheets

ANIMAL VEHICLE SEAT SUPPORT SYSTEM

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to animal vehicle seat devices and more particularly pertains to a new animal vehicle seat device for retaining an animal in a stable position by gyroscopic functionality.

(2) Description of Related Art Including Information Disclosed Under 37 CFR 1.97 and 1.98

The prior art relates to animal vehicle seat devices configured for retaining an animal within a stable position upon a vehicle seat. Known prior art lacks an animal vehicle seat device configured for stabilizing the position of the restrained animal using gyroscopic functionality.

BRIEF SUMMARY OF THE INVENTION

An embodiment of the disclosure meets the needs presented above by generally comprising a cradle having a top portion and a bottom portion. The cradle encloses an interior configured for receiving a small animal. A base ring extends around and is coupled to the cradle such that the base ring is rotationally coupled to the cradle about a first axis. A frame is removably mounted to the vehicle seat and is attached to the base ring such that the base ring is rotational relative to the frame about a second axis. The frame includes a front support including a pair of beams protruding downward relative to the base ring and a back support including a pair of poles protruding upward relative to the base ring. A retainer is coupled to the cradle and is removably couplable to a harness of the small animal positioned within the interior of the cradle.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
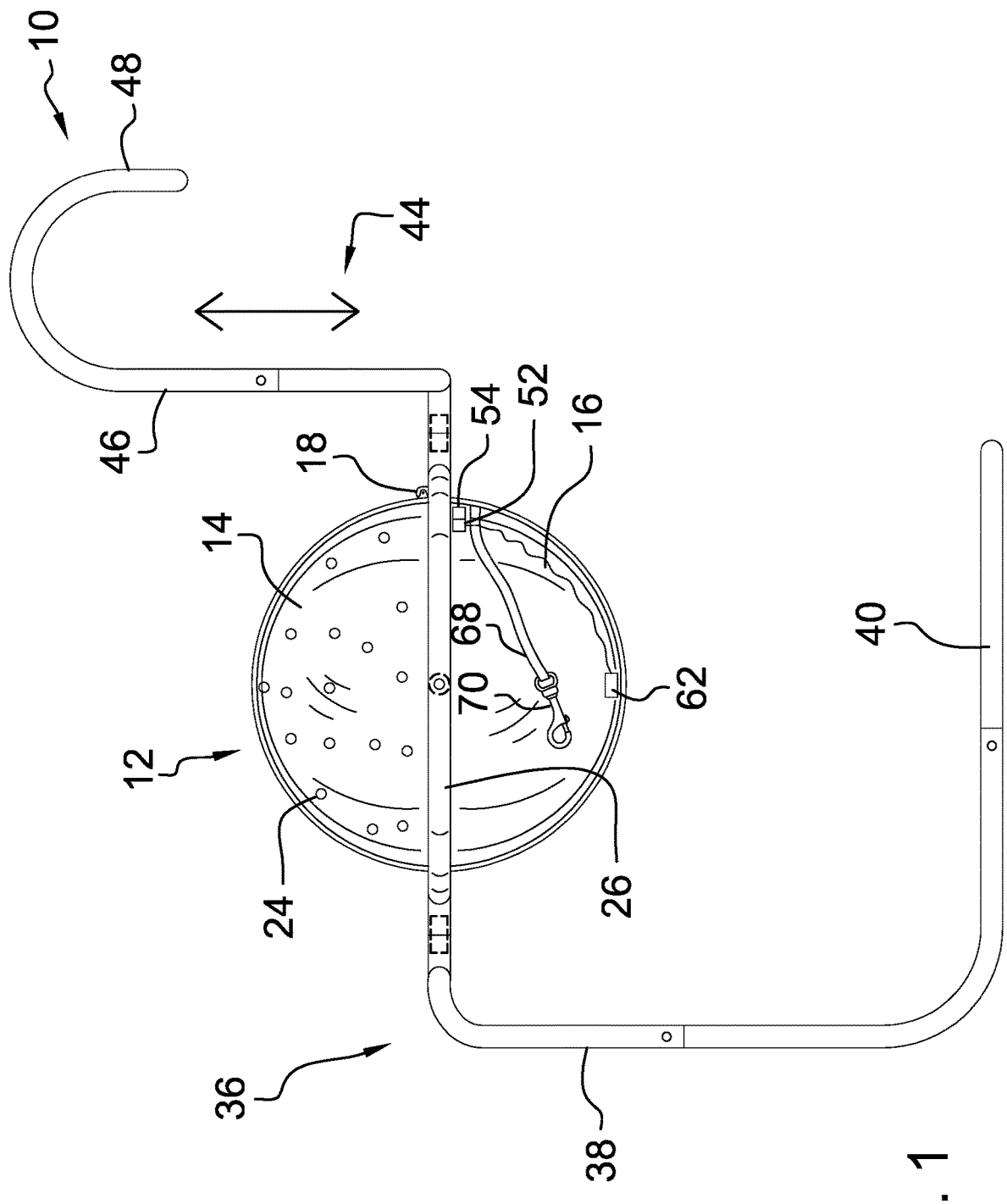
FIG. 1 is a left side view of an animal vehicle seat support system according to an embodiment of the disclosure.
Figure 2:
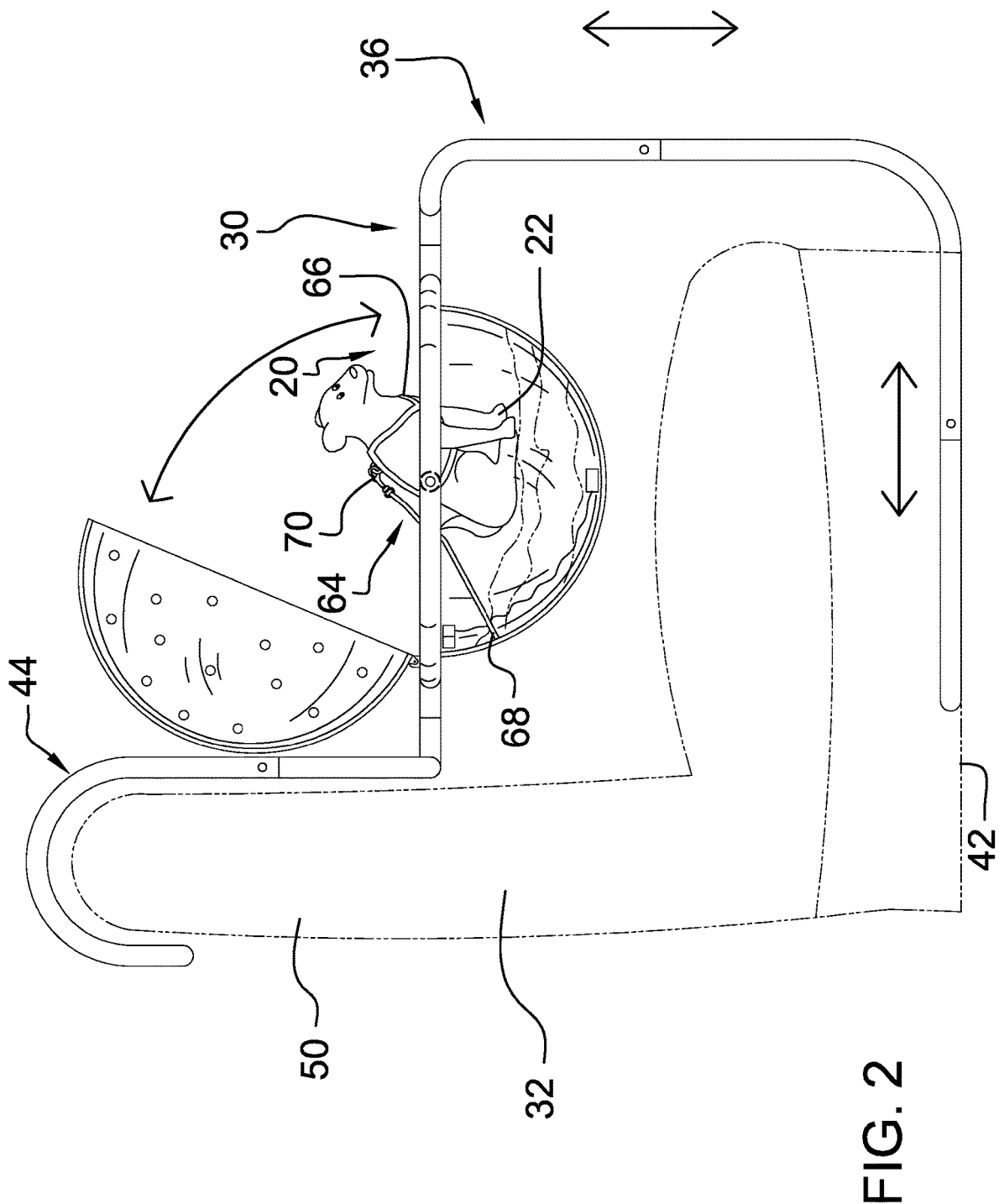
FIG. 2 is a right side in-use view of an embodiment of the disclosure.
Figure 3:
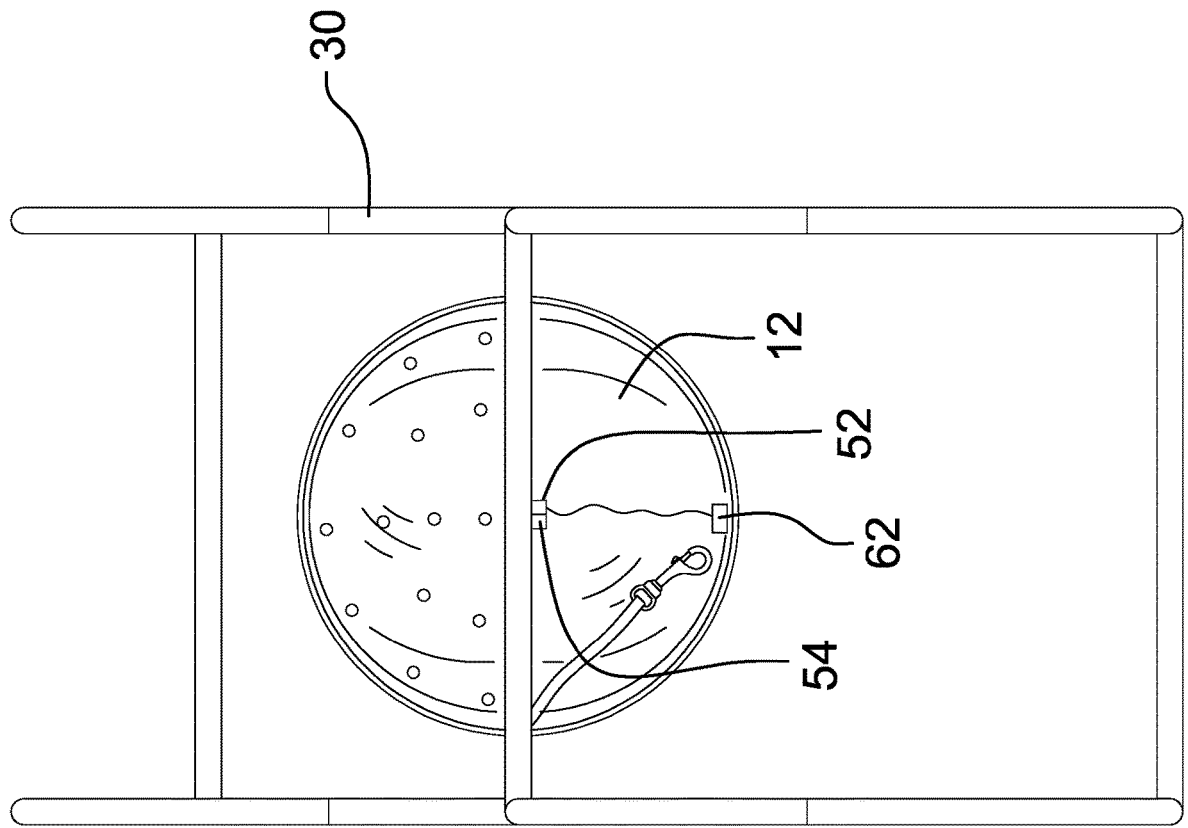
FIG. 3 is a front view of an embodiment of the disclosure.
Figure 4:
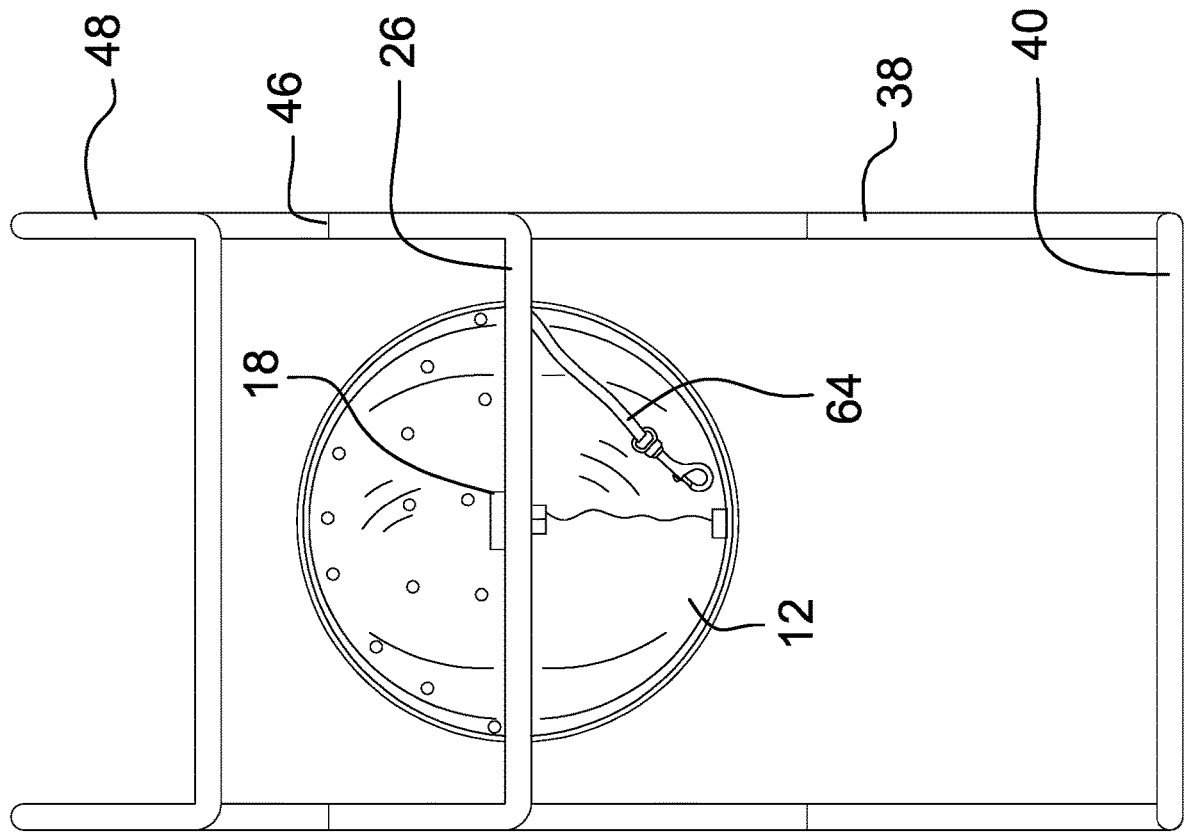
FIG. 4 is a rear view of an embodiment of the disclosure.
Figure 5:
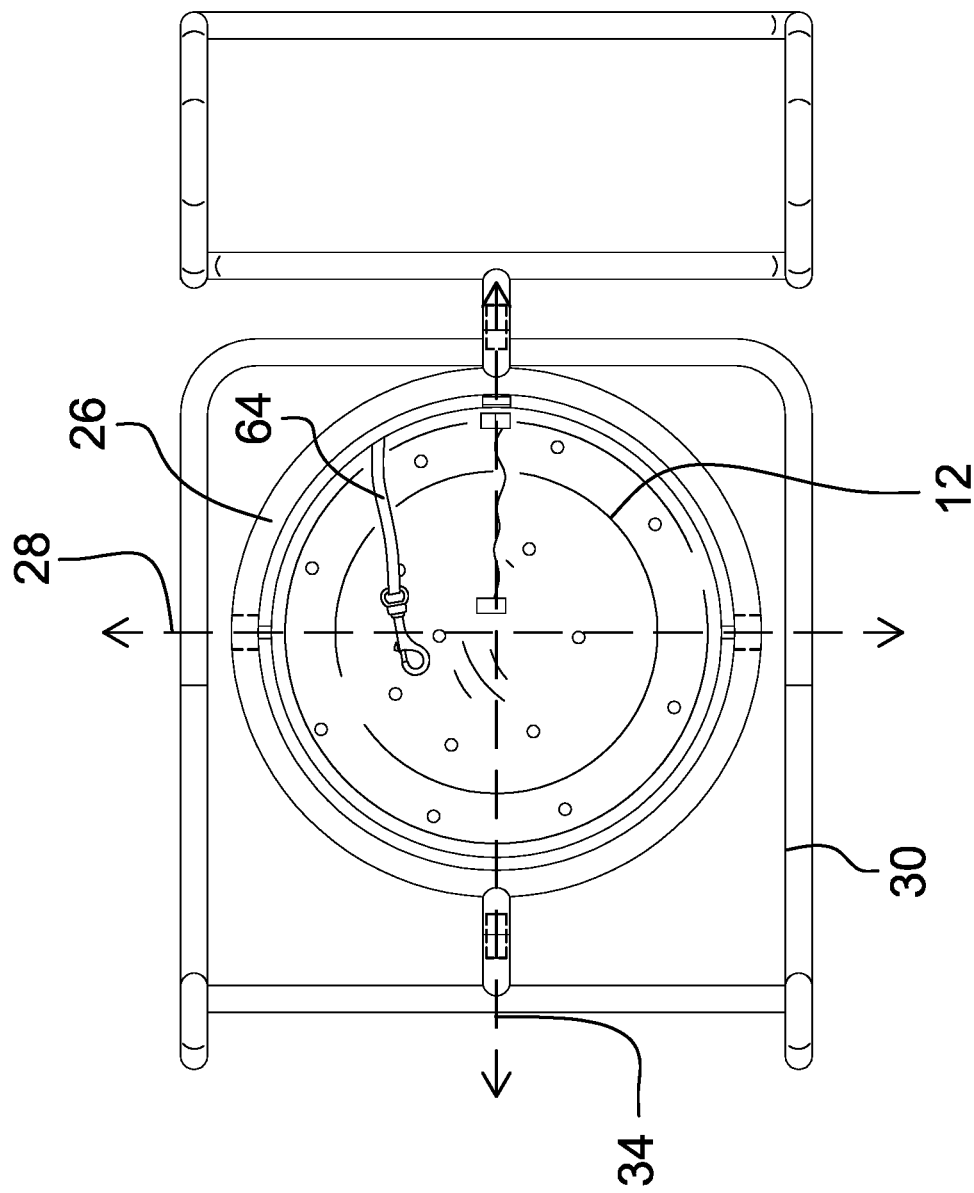
FIG. 5 is a top view of an embodiment of the disclosure.
Figure 6:
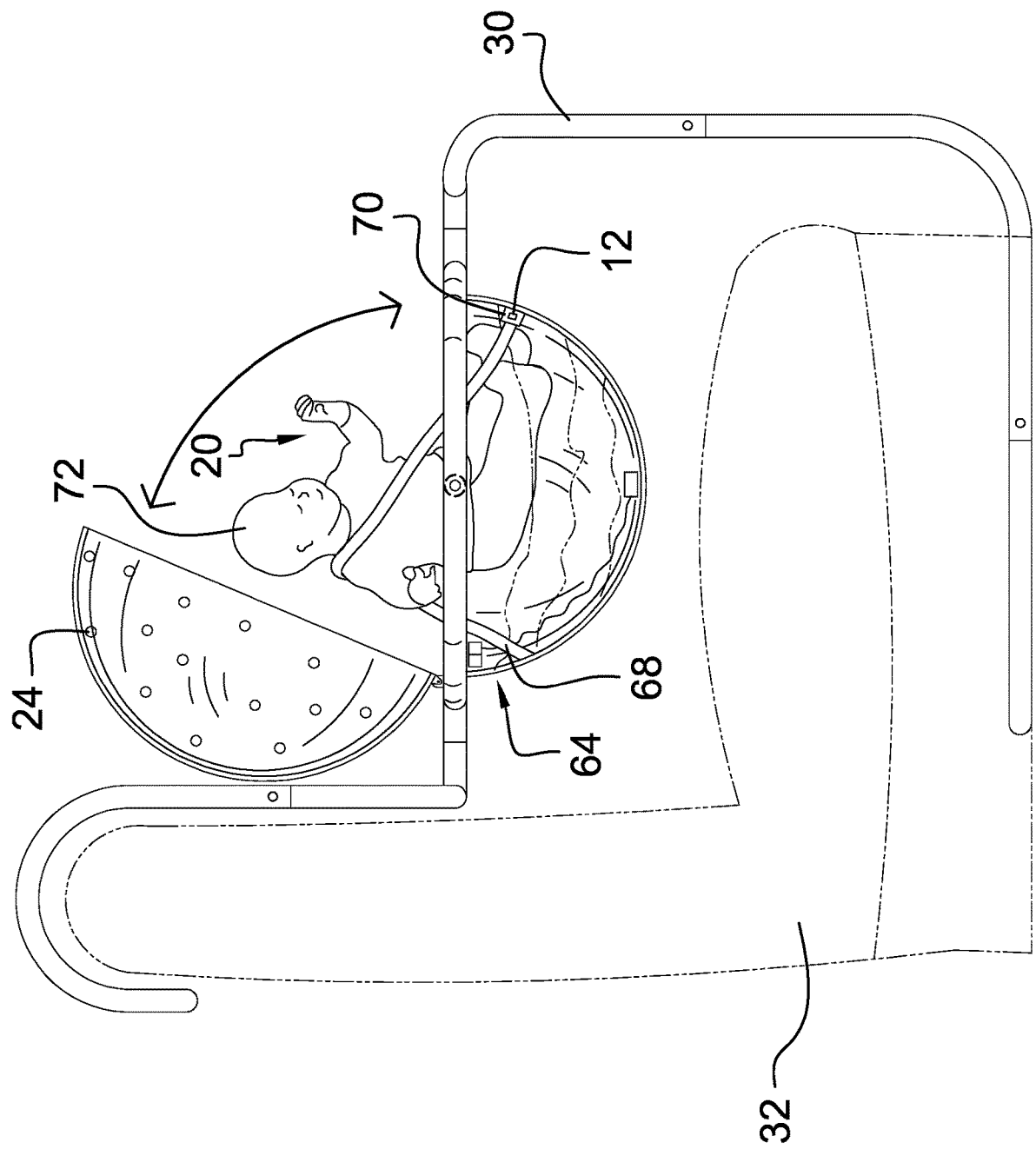
FIG. 6 is an in-use view of an alternative embodiment of the disclosure.
Figure 7:
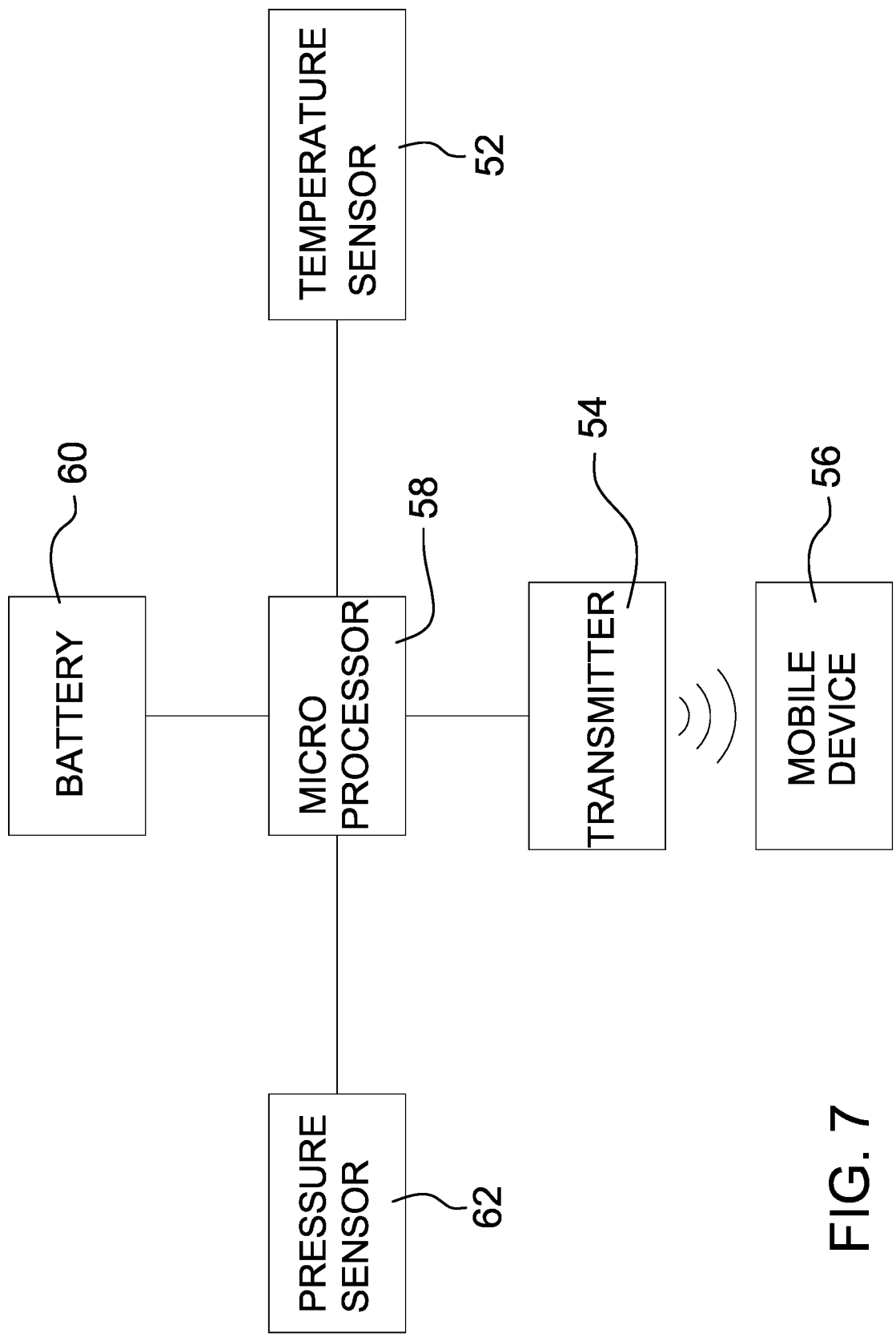
FIG. 7 is a block diagram view of an embodiment of the disclosure.
Figure 8:
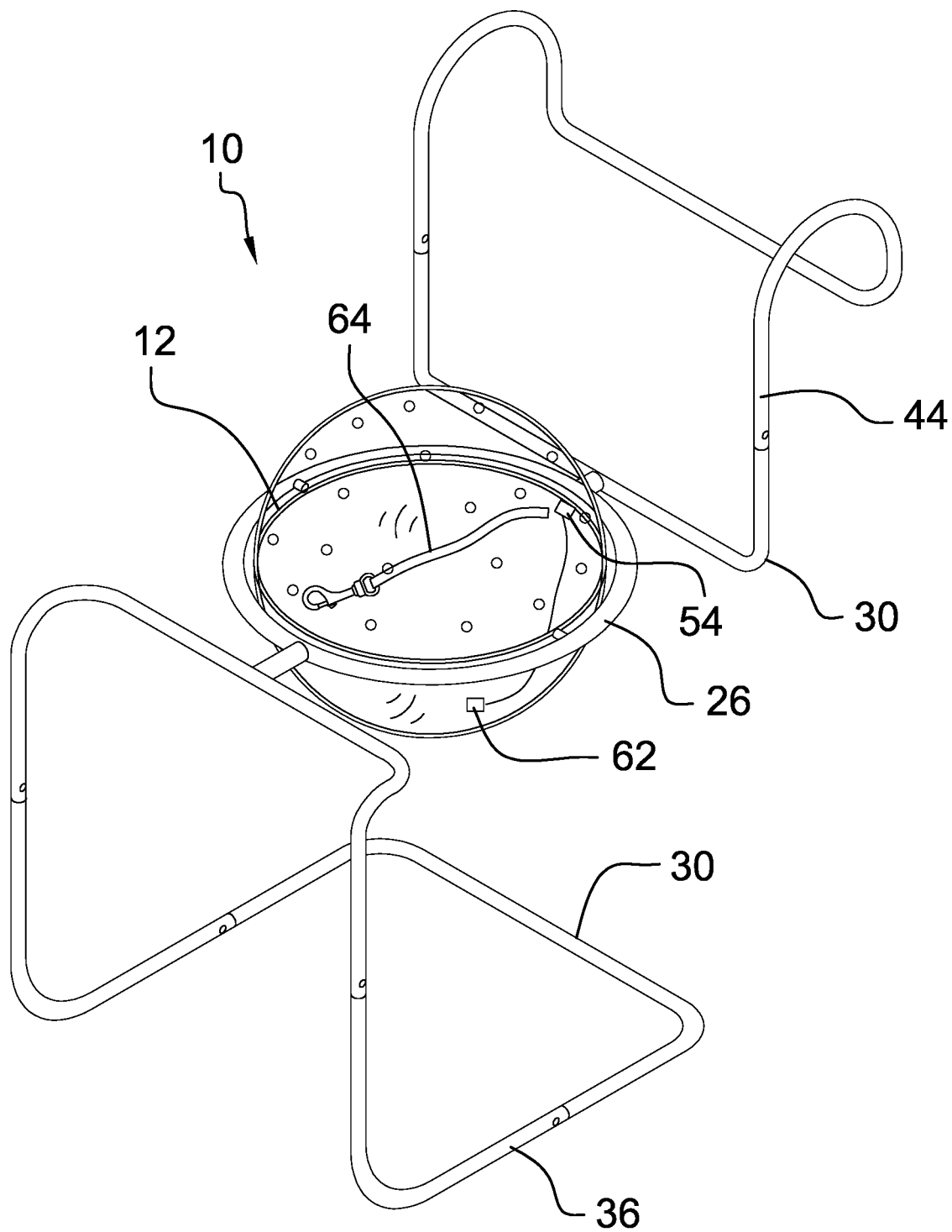
FIG. 8 is an isometric view of an embodiment of the disclosure.
Figure 9:
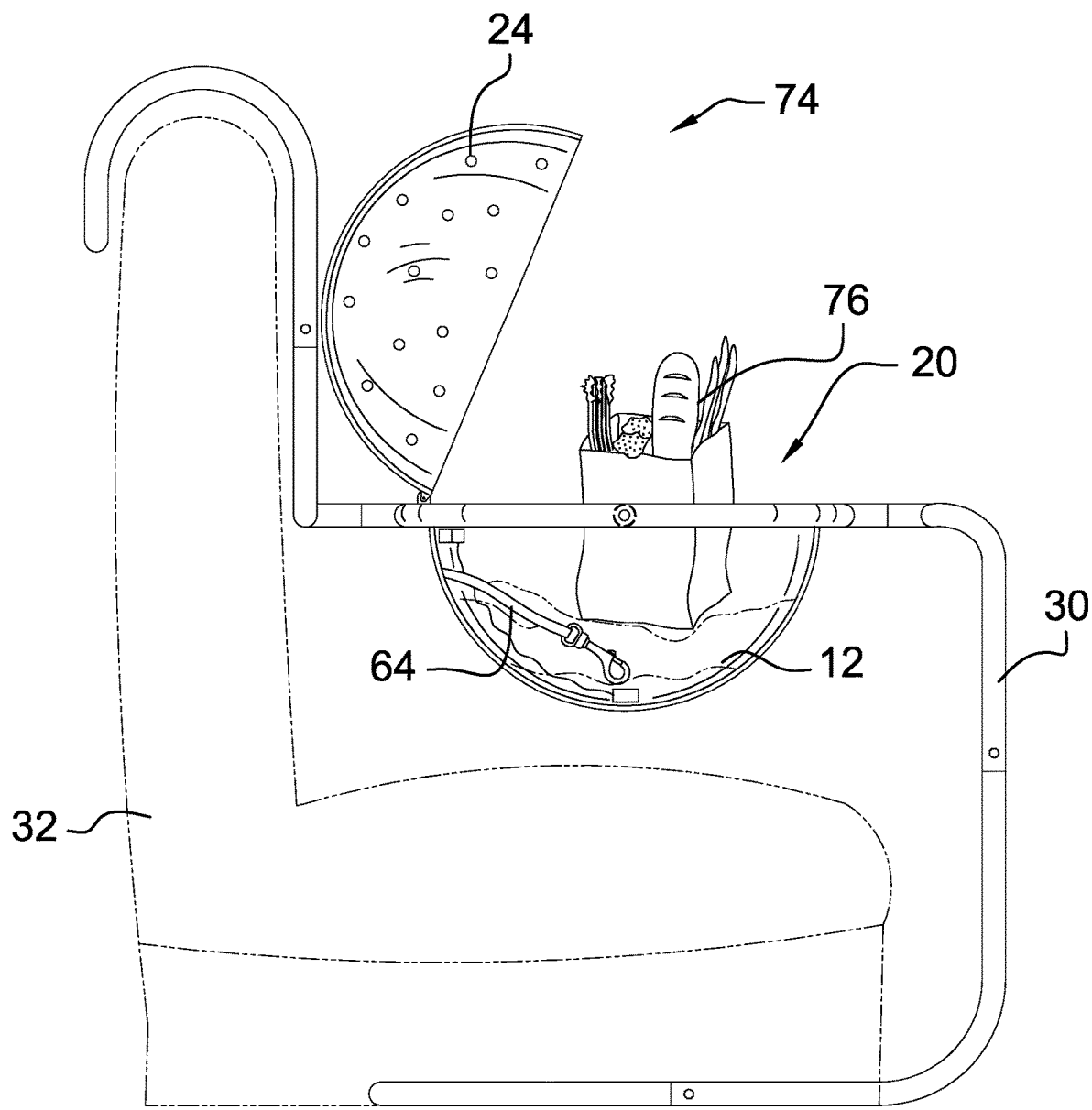
FIG. 9 is an in-use view of an alternative embodiment of the disclosure

With reference now to the drawings, and in particular to FIGS. 1 through 9 thereof, a new animal vehicle seat device embodying the principles and concepts of an embodiment of the disclosure and generally designated by the reference numeral 10 will be described.

As best illustrated in FIGS. 1 through 9, the animal vehicle seat support system 10 generally comprises a cradle 12. The cradle 12 has a top portion 14 and a bottom portion 16. The bottom portion 16 is coupled to the top portion 14 by a hinge 18 such that the bottom portion 16 is in a fixed position relative to the top portion 14. The cradle 12 encloses an interior 20 configured for receiving a small animal 22 such as a dog, cat, or the like. The cradle 12 will typically be comprised of a plastic material and the top portion 14, furthermore, will have a plurality of holes 24 extending therethrough and configured for providing air to the interior 20. The top portion 14 may instead comprise a mesh material positioned on a framework to prevent collapsing thereof.

A base ring 26 extends around and is coupled to the cradle 12. The base ring 26 is rotationally coupled to the cradle 12 about a first axis 28. In a resting state, the first axis 28 is horizontally orientated. The bottom portion 16 is attached to the base ring 26 and will most often be weighted such that the bottom portion 16 hangs downwardly from the base ring 26 in the resting state when there is a lack of lateral forces acting upon the cradle 12.

A frame 30 is removably mounted to the vehicle seat 32. The frame 30 is attached to the base ring 26 such that the base ring 26 is rotational relative to the frame 30 about a second axis 34. In the resting state, the second axis 34 is horizontally orientated. The first 28 and second 34 axes intersect each other and are orientated perpendicular to each other to impart gyroscopic functionality of the cradle 12.

The frame 30 includes a front support 36 comprising a pair of beams 38 protruding downwardly relative to the base ring 26. Each of the beams 38 has an end attached to a lateral support 40 configured for being positioned upon a floor 42 of a vehicle. Each of the beams 38 is telescopic to allow selectively adjustment of a length of the beams 38. The frame 30 further includes a back support 44. The back support 44 includes a pair of poles 46 protruding upwardly relative to the base ring 26. Each of the poles 46 has an end attached to a fastening element 48 that is configured for securing the cradle 12 to a backrest 50 of a seat 32 of the vehicle. In some instances, the fastening element is a hook configured for extending over and engaging a top of the seat 32 of the vehicle. Each of the poles 46 may be telescopic.

A temperature sensor 52 configured for monitoring a temperature within the interior 20 of the cradle 12. A transmitter 54 is electrically coupled to the temperature sensor 52 and is configured to transmit to a receiver 56 a temperature detected by the temperature sensor 52. The receiver 56 may include a cell phone, a vehicle mounted display and/or alarm within the vehicle. A control circuit 58 is electrically coupled to the temperature sensor 52 and the transmitter 54. A power supply 60, which may comprise a battery, is electrically coupled to the control circuit 58 to provide power to the temperature sensor 52 and transmitter 54.

A weight sensor 62 is mounted in the bottom portion 16 of the cradle 12 and is electrically coupled to the control circuit 58. The weight sensor 62 is configured to detect a threshold weight positioned in the bottom portion 16. The control circuit 58 is programmed to actuate the transmitter 54 to send an alarm signal to the receiver 56 when the weight sensor 62 detects a weight greater than the threshold weight and the temperature sensor 52 detects a temperature greater than a threshold temperature.

A retainer 64 is coupled to the cradle 12 and is removably couplable to a harness 66 of the small animal 22 positioned within the interior 20 of the cradle 12. The retainer 64 may comprise a tether 68 such as a conventional vehicle seat strap being attached to the cradle 12 within the interior 20 and protruding outwardly from the cradle 12. A coupler 70 is coupled to an end of the tether 68 and may comprise a clasp or any other conventional coupler used to secure to the harness 66 of the small animal 22. The coupler 70 may also comprise a seat buckle clasp and the cradle 12 may have a seat buckle to removably receive the seat buckle clasp, wherein an infant 72 may be secured within the interior 20 of the cradle 12.

In use, the frame 30 is positioned upon the vehicle seat 32 such that the back support 44 is secured to the backrest 50 of the vehicle seat 32 and the front support 36 is positioned on the floor 42 of the vehicle. The small animal 22 is positioned in the interior 20 of the cradle 12 such that the bottom portion 16 will be positioned downward when in-use. The temperature sensor 52 will notify a receiver 56 when the temperature within the interior 20 of the cradle 12 surpasses the threshold temperature and the interior 20 of the cradle 12 is deemed to be dangerous for the small animal 22. In an alternative embodiment 74, inanimate objects 76 such as grocery articles may be received within the interior 20 of the cradle 12.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A vehicle seat support system configured for carrying a small animal upon a vehicle seat, the vehicle seat support system comprising:
    a cradle having a top portion and a bottom portion, said cradle enclosing an interior configured for receiving a small animal;
    a base ring extending around and being coupled to said cradle, said base ring being rotationally coupled to said cradle about a first axis;
    a frame being removably mounted to the vehicle seat, said frame being attached to said base ring such that said base ring is rotational relative to said frame about a second axis, said first and second axes being orientated perpendicular to each other, said first and second axes lying in a horizontal plane when said cradle is in a resting state, said frame including:
        a front support including a pair of beams protruding downward relative to said base ring; and
        a back support including a pair of poles protruding upward relative to said base ring; and
    a retainer being coupled to said cradle and being removably couplable to a harness of the small animal positioned within said interior of said cradle.

2. The vehicle seat support system of claim 1, wherein said top portion is coupled to said bottom portion by a hinge.

3. The vehicle seat support system of claim 1, wherein said cradle is comprised of a plastic material.

4. The vehicle seat support system of claim 3, wherein said top portion has a plurality of holes extending therethrough configured for providing air to said interior.

5. The vehicle seat support system of claim 1, further including said bottom portion being attached to said base ring and weighted such that said bottom portion hangs downwardly from said base ring when there are a lack of lateral forces acting upon said cradle.

6. The vehicle seat support system of claim 1, wherein each of said beams has an end being attached to a lateral support.

7. The vehicle seat support system of claim 6, wherein each of said beams is telescopic to allow selectively adjustment of a length of said beams.

8. The vehicle seat support system of claim 1, further including a fastening element being attached to an end of each of said poles, said fastening element being configured for securing said cradle to a backrest of a seat of said vehicle.

9. The vehicle seat support system of claim 8, wherein each of said poles being telescopic.

10. The vehicle seat support system of claim 1, further including a temperature sensor configured for monitoring a temperature within said interior of said cradle.

11. The vehicle seat support system of claim 1, further including a transmitter being electrically coupled to said temperature sensor and being configured to transmit to a receiver a temperature detected by said temperature sensor.

12. The vehicle seat support system of claim 11, further comprising a control circuit being electrically coupled to said temperature sensor and said transmitter.

13. The vehicle seat support system of claim 12, further including a power supply being electrically coupled to said control circuit.

14. The vehicle seat support system of claim 13, further including a weight sensor being mounted in said bottom portion and being electrically coupled to said control circuit, said weight sensor being configured to detect a threshold weight positioned in said bottom portion.

15. The vehicle seat support system of claim 14, further including said control circuit being programmed to actuate said transmitter to send an alarm signal to the receiver when the weight sensor detects a weight greater than the threshold weight and said temperature sensor detects a temperature greater than a threshold temperature.

16. The vehicle seat support system of claim 1, wherein said retainer comprises a tether being attached to said cradle within said interior and protruding outwardly therefrom, a coupler being coupled to an end of said tether, said coupler comprising a clasp.

17. A vehicle seat support system configured for carrying a small animal upon a vehicle seat, the vehicle seat support system comprising:
  a cradle having a top portion and a bottom portion, said top portion being coupled to said bottom portion by a hinge, said cradle enclosing an interior configured for receiving a small animal;
  a base ring extending around and being coupled to said cradle, said base ring being rotationally coupled to said cradle about a first axis, in a resting state said first axis is horizontally orientated, said bottom portion being attached to said base ring and weighted such that said bottom portion hangs downwardly from said base ring when there are a lack of lateral forces acting upon said cradle;
  a frame being removably mounted to the vehicle seat, said frame being attached to said base ring such that said base ring is rotational relative to said frame about a second axis, in said resting state said second axis is horizontally orientated, said first and second axes intersecting each other and being orientated perpendicular to each other, said frame including:
    a front support including a pair of beams protruding downward relative to said base ring, each of said beams having an end attached to a lateral support, each of said beams being telescopic to allow selectively adjustment of a length of said beams;
    a back support including a pair of poles protruding upward relative to said base ring, each of said poles having an end attached to a fastening element, said fastening element being configured for securing said cradle to a backrest of a seat of said vehicle, each of said poles being telescopic;
  a temperature sensor configured for monitoring a temperature within said interior of said cradle;
  a transmitter being electrically coupled to said temperature sensor and being configured to transmit to a receiver a temperature detected by said temperature sensor;
  a control circuit being electrically coupled to said temperature sensor and said transmitter;
  a power supply being electrically coupled to said control circuit;
  a weight sensor being mounted in said bottom portion and being electrically coupled to said control circuit, said weight sensor being configured to detect a threshold weight positioned in said bottom portion, said control circuit being programmed to actuate said transmitter to send an alarm signal to the receiver when the weight sensor detects a weight greater than the threshold weight and said temperature sensor detects a temperature greater than a threshold temperature; and
  a retainer being coupled to said cradle and being removably couplable to a harness of the small animal positioned within said interior of said cradle, said retainer comprising a tether being attached to said cradle within said interior and protruding outwardly therefrom, a coupler being coupled to an end of said tether, said coupler comprising a clasp.

* * * * *